Figure 1:
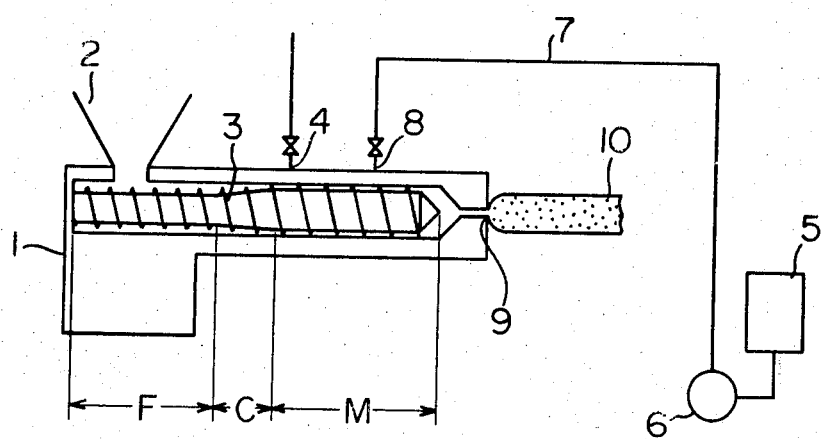

United States Patent [19]

Komori

[11] 4,217,319
[45] Aug. 12, 1980

[54] PROCESS FOR PRODUCING POLYOLEFIN FOAMS

[75] Inventor: Tetsuo Komori, Utsunomiya, Japan

[73] Assignee: Japan Styrene Paper Corporation, Ltd., Tokyo, Japan

[21] Appl. No.: 967,974

[22] Filed: Dec. 11, 1978

[30] Foreign Application Priority Data

Dec. 13, 1977 [JP] Japan ................ 52-149529

[51] Int. Cl.² ............................................. B29D 27/00
[52] U.S. Cl. ........................................ 264/53; 264/211;
264/DIG. 5; 264/DIG. 13; 425/376 R;
425/817 C
[58] Field of Search .......... 264/53, DIG. 5, DIG. 13,
264/211; 425/376 R, 817 C

[56] References Cited

U.S. PATENT DOCUMENTS

| | | | |
|---|---|---|---|
| 3,287,477 | 11/1966 | Vesilind | 264/53 |
| 3,644,230 | 2/1972 | Cronin | 264/53 X |
| 3,755,208 | 8/1973 | Ehrenfreund | 264/53 X |

FOREIGN PATENT DOCUMENTS 46-43997 12/1971 Japan.
46-43998 12/1971 Japan.
1210626 10/1970 United Kingdom.

*Primary Examiner*—Philip Anderson
*Attorney, Agent, or Firm*—Sherman & Shalloway

[57] ABSTRACT

In a process for producing a foamed polyolefin article which comprises melting and mixing a polyolefin, a volatile organic blowing agent, a cell size-controlling agent, and an ester of a long-chain fatty acid and a polyhydric alcohol in an extruder comprising a feed zone, a compression zone and a metering zone, and extruding the resultant molten gel into an area having a lower pressure than the pressure of the inside of the extruder, the improvement wherein said ester is at least one ester of a long-chain fatty acid having 8 to 20 carbon atoms and a polyhydric alcohol having 3 to 6 hydroxyl groups, and said ester is fed in the molten state into the molten gel within the metering zone and mixed with it.

2 Claims, 1 Drawing Figure

PROCESS FOR PRODUCING POLYOLEFIN FOAMS

This invention relates to a process for the production of polyolefin foams.

Generally, polyolefin foams (this may be referred to hereinbelow simply as "foams") are produced by feeding a composition composed of a polyolefin, a cell size controlling agent and other additives into an extruder, melting the composition under heat, injecting a blowing agent into the molten gel, and extruding the resultant molten gel through a die fitted at the tip of the extruder exit into an area having a lower pressure than the pressure of the inside of the extruder. The resulting foam shrinks after extrusion. In order to regain the original dimension of the asextruded foam as much as possible, the foam product is aged for a long period of time. However, aging requires a large space, and a considerable time is required from production to shipping. These are not commercially advantageous.

In an attempt to reduce or eliminate the collapsing of the cells of foams or the shrinking of the foams, it was suggested to add a partial ester of a fatty acid and a polyol to a composition composed of a polymer, and other additives to be fed to a hopper of an extruder (U.S. Pat. No. 3,644,230 to Edward W. Cronin). This method can reduce the shrinking of foams to some extent. However, according to the disclosure of this prior patent, when a partial ester of a fatty acid and a polyol is fed into a hopper of an extruder together with a polymer and additives for preparation of foams, a feed trouble occurs at the screw section, and the extruding operation cannot be performed satisfactorily. Consequently, foams of good quality cannot be produced smoothly.

It is an object of this invention to provide a process for producing polyolefin foams having superior dimensional stability and little or no shrinking while overcoming the disadvantages of the prior art process cited above.

The present inventor, as a result of his work in an attempt to achieve the above object, has found that when an ester of a long-chain fatty acid and a polyhydric alcohol is fed into a molten gel of a polyolefin stock in an extruder at its metering zone, the molten gel can be extruded smoothly, and the shrinking of the foams can be eliminated, and that it possible to produce with good efficiency a polyolefin foam having uniform fine closed cells and good appearance.

According to this invention, there is provided a process for producing a foamed polyolefin article which comprises melting and mixing a polyolefin, a volatile organic blowing agent, a cell size-controlling agent and an ester of a long-chain fatty acid and a polyhydric alcohol in an extruder comprising a feed zone, a compression zone and a metering zone, and extruding the resultant molten gel into an area having a lower pressure than the pressure of the inside of the extruder, wherein said ester is at least one ester of a fatty acid having 8 to 20 carbon atoms and a polyhydric alcohol having 3 to 6 hydroxyl groups, and said ester is fed in the molten state into the molten gel within the metering zone of the extruder and mixed with the molten gel therein.

In the process of this invention, the ester of a long-chain fatty acid having 8 to 20 carbon atoms and a polyhydric alcohol having 3 to 6 hydroxy groups should be fed, in the molten state, into the molten gel within the metering zone of the extruder at a position corresponding to an L/D of at least 20 toward the hopper from the tip of the screw of the extruder. Though the blowing agent is also injected into the metering zone of the extruder, the molten ester is preferably fed into a part nearer to the die of the extruder than the part into which the blowing agent has been fed.

As the molten gel mixed with the blowing agent has a lower viscosity than the molten gel mixed without the blowing agent and a lower pressure, the ester can be fed easily at lower pressures, and can be mixed uniformly and rapidly with the molten gel.

In the process of this invention, the ester in the molten state is fed into the metering zone of the extruder at a pressure higher than the pressure of the inside of the extruder. Although varying depending upon the structure of the extruder, etc., the pressure required for the feeding of the ester is generally about 100 to 300 kg/cm$^2$.

The esters of long-chain fatty acids having 8 to 20 carbon atoms and polyhydric alcohols having 3 to 6 hydroxyl groups in this invention include, for example, glycerol mono-, di- or tri-laurate, glycerol mono-, di- or tri-palmitate, glycerol mono-, di- or tri- stearate, glycerol mono-, di- or tri-oleate, glycerol mono-, di- or tri-caprylate, mixtures of mono-, di- and tri-esters of each said species in suitable combinations, sorbitan monolaurate, sorbitan monopalmitate, sorbitan monostearate, and sorbitan monooleate. They can be used either singly or as a mixture of two or more.

The ester is used generally in an amount of 0.1 to 10 parts by weight, preferably 0.5 to 5 parts by weight, per 100 parts by weight of the polyolefin. If the amount of the ester is too small, an effect of preventing shrinkage cannot be obtained. If the amount is too large, the ester may bleed out on the surface of the resulting foams, and when the foams are used as packaging materials, the ester will migrate to articles to be packaged.

In addition to producing an effect of preventing shrinkage, the ester also serves for antistatic prevention, and contributes to the improvement of other properties, especially compressive strength and tensile strength, of the foams. Hence, the ester can permit the formation of foamed products having superior elasticity and beautiful appearance.

The polyolefins used in this invention include (1) homopolymers or copolymers of 60-olefins such as ethylene, propylene, 1-butene, 1-pentene or 4-methyl-1-pentene; (2) copolymers of such α-olefins with other polymerizable vinyl monomers such as vinyl acetate, methyl methacrylate, vinyl chloride,, styrene or acrylonitrile; (3) mixtures of the polymers (1) with the polymers (2); (4) mixtures of the polymers (1) or (2) with polymers of the vinyl monomers described above; and (5) mixtures of the polymers (1) or (2) with natural rubber or synthetic rubbers such as butadiene rubber or butyl rubber.

The blowing agent used in this invention is a normally gaseous or liquid volatile organic compound, and includes, for example, saturated hydrocarbons such as propane, n-butane, iso-butane, cyclopropane, cyclobutane and pentane; halogenated hydrocarbons such as dichlorofluoromethane, dichlorodifluoromethane, trichlorofluoromethane, dichlorotetrafluoroethane, chloromethane, and methylene chloride; and aliphatic ethers such as dimethyl ether, methyl ethyl ether or diethyl ether. These compounds are used either singly or as a mixture of two or more. Usually, the amount of the blowing agent is 2 to 30 parts by weight per 100 parts by weight of the polyolefin.

Any of known cell size-controlling agents can be used in this invention. Examples are inorganic cell size-controlling agents such as clay, talc or silica, and organic cell size- controlling agents which decompose or react at the heating temperature within the extruder to evolve gases, such as a combination of an alkali metal salt of a polycarboxylic acid such as sodium hydrogen tartrate, potassium hydrogen succinate, sodium citrate, potassium citrate or sodium oxalate with a carbonate or bicarbonate such as sodium bicarbonate, sodium carbonate, potassium bicarbonate, potassium carbonate or calcium carbonate. Of these, the organic cell size- controlling agents are preferred. A combination of a monoalkali metal salt of a polycarboxylic acid such as monosodium citrate, mono- sodium tartrate with a carbonate or bicarbonate is especially preferred. If desired, other additives such as coloring agents or fire retardants, antioxydants and plasticizers may be used.

The process of the present invention is described below by reference to the accompanying drawing.

FIG. 1 shows the outline of one embodiment of the present invention. In FIG. 1, the reference numeral 1 represents the main body of an extruder; 2, a hopper; 3, a screw; 4, an injection port for a blowing agent; 5, a melting tank for the ester used in the invention; 6, a feed pump for the molten ester; 7, a conduit; 8, a feed port for the molten ester; 9, a die; and 10, a foamed product.

A screw extruder is generally divided into a feed zone, a compression zone and a melt zone. The feed zone is adapted to convey the feed stock from the hopper to the subsequent compression zone while compounding the stock. The compression zone receives the stock conveyed from the feed zone, and melts and kneads it. In the melt zone, the stock is in the completely molten and mixed state, and forms a pulsation-free flow.

In FIG. 1, F represents a feed zone; C, a compression zone; and M, a metering zone. The metering zone in this invention corresponds to the melt zone described above. In the metering zone, the molten gel mixed and conveyed through the feed zone and compression zone forms a uniform flow so that it can be extruded at a fixed rate from the die.

The starting polyolefin together with a cell size controlling agent and other required additives is fed into the extruder through the hopper 2, mixed and melted by the screw 3 and moved toward the die exit. The blowing agent is injected into the molten gel from the injection port 4 provided in the extruder barrel. The ester used in this invention is heated to a temperature above its melting point in the melting tank 5, conveyed by the pump 6 through the conduit 7, and fed into the molten gel through the feed port 8 provided in the extruder barrel. It is then uniformly mixed with the molten gel, and extruded through the die 9 into an area having a lower pressure than the pressure of the inside of the extruder to give the foam 10.

The pump for feeding the molten ester into the molten gel within the extruder may, for example, be a plunger pump or a gear pump. The amount of the molten ester to be fed into the molten gel within the extruder can be adjusted properly by changing the stroke of the pump. To perform the feeding of the molten ester smoothly, it is desirable to apply a back pressure to the melting tank by using an inert gas such as air or nitrogen. Conveniently, the conduit is thermally insulated by a suitable insulating material, or heated by a heater to prevent the solidification of the molten ester within the conduit. It is also possible to build the conduit in a double wall structure, and heat it by steam or the like.

Single or multiple screw extruders can be used for the extruding operation.

According to the invention, the ester in a desired amount can be easily fed into the molten gel within the extruder without causing a feed trouble, and foams having the ester uniformly included in it can be produced.

The following Examples and Comparative Examples, in which parts are by weight unless otherwise specified, illustrate the invention in more detail.

EXAMPLE 1

A 45 mm diameter single screw extruder was charged with 100 parts of low-density polyethylene, 0.3 part of monosodium citrate and 0.4 part of sodium bicarbonate, and these material were compounded and melted. Butane (15 parts) was forced into the molten gel of the stock through an injection port provided at a fixed position of the extruder barrel. Separately, glycerol monostearate was heated and melted in a melting tank at 100° C., and fed by a gear pump into the molten gel of the stock containing the blowing agent from an injection port provided at a fixed position of the extruder barrel (nearer to the die exit than the injection port for the blowing agent and corresponding to $L/D=20$ toward the hopper from the tip of the screw). The amount of the molten ester fed was 1 part based on the starting polyethylene. Under heat, the glycerol monostearate and the foamable molten gel containing the blowing agent were kneaded, and the mixture extruded through the die at 125° C. into the atmosphere to give a foam. The foam had a density of 0.03 g/cm$^3$ and contained uniform fine cells. One hour after production, the foam showed a volume shrinkage of 2%. The foam had elasticity and a compressive strength, measured in the thickness direction at a compression strain of 25%, of 0.25 kg/cm$^2$.

EXAMPLE 2

The procedure of Example 1 was repeated except that the amount of the glycerol monostearate was changed to 5 parts. The resulting foam had a density of 0.3 g/cm$^3$ and uniform fine cells. One hour after production, the foam showed a volume shrinkage of only 0.5% and had a compressive strength, measured in the thickness direction at a compression strain of 25%, of 0.3 kg/cm$^2$.

COMPARATIVE EXAMPLE 1

The procedure of Example 1 was repeated except that the glycerol monostearate was not used. The resulting foam, immediately after the production, had a density of 0.03 g/cm$^3$ and contained uniform fine cells, but one hour after the production, showed a volume shrinkage of 70%. The foam had a compressive strength measured in the thickness direction at a compression strain of 25%, of 0.08 kg/cm$^2$.

EXAMPLE 3

A mixture consisting of 100 parts of an ethylene/vinyl acetate copolymer (with a vinyl acetate content of 10%), 0.3 part of monosodium citrate and 0.4 part of sodium bicarbonate was fed into the same extruder as used in Example 1, and kneaded and melted. From an injection port, 20 parts of dichlorodifluoromethane was injected into the molten gel within the extruder. Then, 3 parts, based on the starting polymer, of glycerol monooleate heated in advance to 90° C. and melted was fed through an ester feeding port of the extruder barrel into the molten gel containing the blowing agent, and kneaded under heat. The resulting foamable molten gel was extruded through the die at 120° C. into the atmosphere to give a foam. The resulting foam had a density of 0.04 g/cm$^2$ and contained uniform fine cells. One hour after the production, the foam showed a volume shrinkage of only 1%. Its compressive strength, measured in the thickness direction at a compression strain of 25%, was 0.2 kg/cm$^2$.

COMPARATIVE EXAMPLE 2

The procedure of Example 2 was repeated except that the glycerol monooleate was not used. The resulting foam, immediately after the production, had a density of 0.04 g/cm$^3$ and contained uniform fine cells. One hour after the production, the foam showed a volume shrinkage of 50%.

COMPARATIVE EXAMPLE 3

A mixture consisting of 100 parts of low-density polyethylene, 0.3 part of monosodium citrate, 0.4 part of sodium bicarbonate and 1 part of glycerol monostearate was fed into the same extruder as used in Example 1 through its hopper. Butane (15 parts) was fed into the molten gel within the extruder through an injection port disposed at a fixed position, and the molten gel extruded. In about 5 minutes after the initiation of the extrusion, the stock fed from the hopper caused a feed trouble at the screw section, and the continuous operation of the extruder failed. Hence, the desired foam could not be produced.

COMPARATIVE EXAMPLE 4

The same procedure as in Comparative Example 3 was repeated except that the amount of the glycerol monostearate was changed to 0.8, 0.6, 0.5, and 0.4 part, respectively. The results are shown in the following table.

| Glycerol monosterate (parts) | 0.8 | 0.6 | 0.5 | 0.4 |
|---|---|---|---|---|
| Exrtrusion operation for producing foam | Impossible | Impossible | Long-term operation impossible | possible |
| Volume shrinkage of the foam (1 hour after the production) | — | — | About 7%; but good-quality products cannot be obtained constantly | 30% |

What is claimed is:

1. In a process for producing a foamed polyolefin article which comprises melting and mixing a polyolefin, a volatile organic blowing agent, a cell size-controlling agent, and an ester of a long-chain fatty acid and a polyhydric alcohol in an extruder comprising a feed zone, a compression zone and a metering zone, and extruding the resultant molten gel into an area having a lower pressure than the pressure of the inside of the extruder, the improvement wherein said ester is at least one glycerol ester of fatty acid having 8 to 20 carbon atoms, and said ester is fed in a molten state into the molten gel within the metering zone at a position nearer to the die exit of the extruder than the injection port for the blowing agent, said position corresponding to an L/D of at least 20 toward a hopper of the extruder from the tip of the screw.

2. The process of claim 1, wherein the glycerol ester of fatty acid having 8 to 20 carbon atoms is glycerol monostearate.

* * * * *